July 6, 1954     I. R. LANG     2,683,052
LOCKING MECHANISM
Filed May 29, 1952
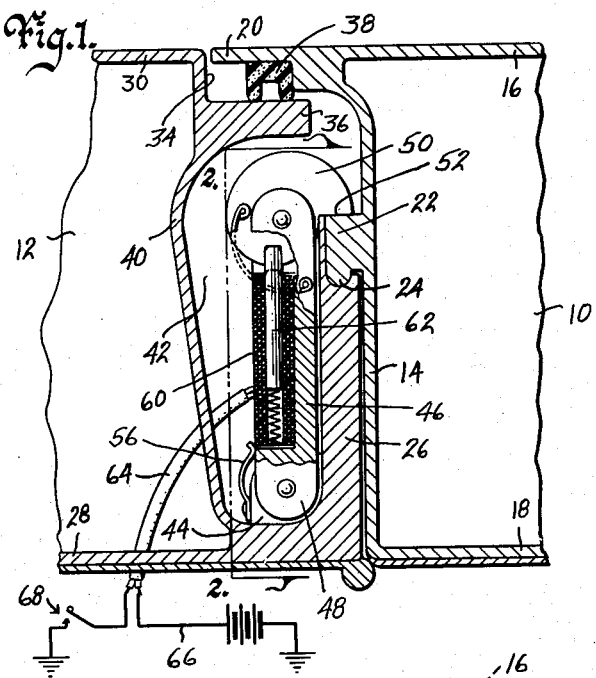
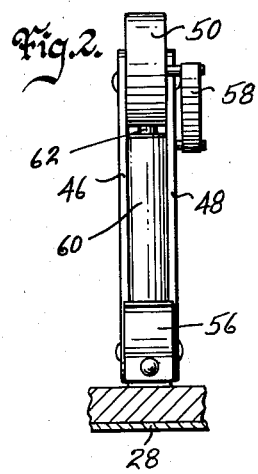
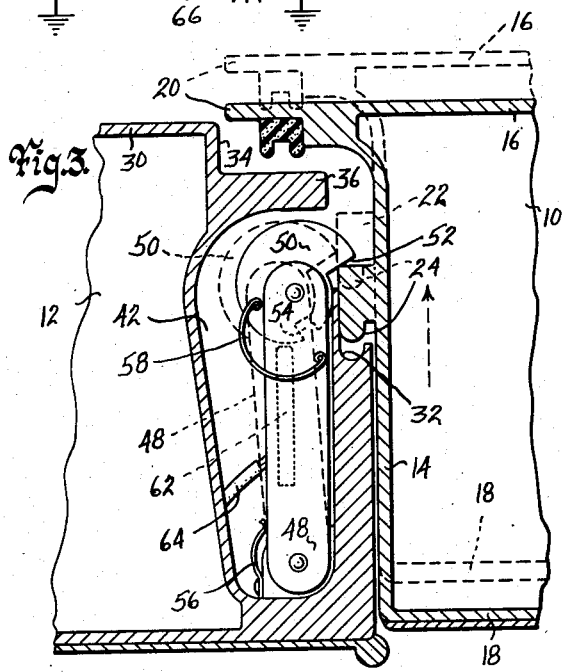
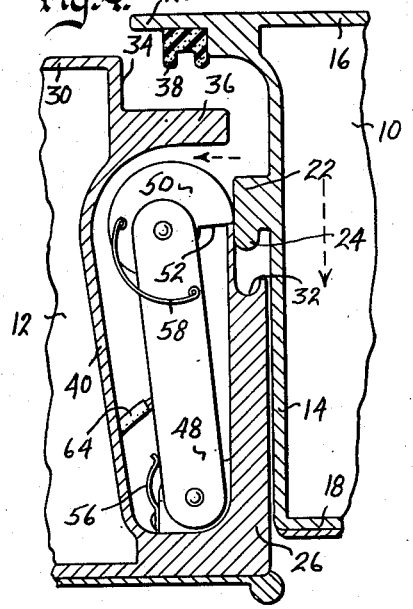
Inventor
Ivan R. Lang
by Talbert Dick & Adler
Attorneys
Witness
Edward P. Seeley

UNITED STATES PATENT OFFICE 2,683,052

LOCKING MECHANISM

Ivan R. Lang, Omaha, Nebr.

Application May 29, 1952, Serial No. 290,681

2 Claims. (Cl. 292—304)

My invention relates to locking mechanisms and a preferred embodiment thereof is disclosed as applied to the door on a motor vehicle body.

It is the general aim of my invention to provide a locking mechanism for a door means or the like that securely holds the door latch against any movement in four directions whereby the possibility of an accidental opening of the door from sudden jars or impact is substantially reduced and for all practical purposes is eliminated.

A further object of my invention is to provide a locking means of the above class which embodies the use of an electromagnet in releasing it from locked position, but does not require the action of the electromagnet to place it in locked position.

Still another object of this invention is to provide a locking mechanism for a door or the like that requires no movable parts on the door to be locked.

These and other objects will be apparent to those skilled in the art.

My invention consists in the construction, arrangement, and combination of the various parts of the device, whereby the objects contemplated are attained as hereinafter more fully set forth, and specifically pointed out in my claims, and illustrated in the accompanying drawings, in which:

Fig. 1 is an elevational view of a fragmentary portion of a vehicle door and door post in locked position partly in section, illustrating a preferred embodiment of my invention, Fig. 2 is a side elevational view of my locking mechanism taken from the lines 2—2 of Fig. 1, Fig. 3 is a view of this device similar to Fig. 1, but showing the door in the process of being opened, and Fig. 4 is similar to Fig. 1 but showing the door in the process of being closed.

Referring to the drawings, I have selected an automobile door to illustrate my invention, the door being indicated generally at 10 and the door post at 12, and it will perhaps aid in understanding the description to follow if the door 10 is viewed as being the left front door on a vehicle body. It will be understood that only a fragmentary portion of the door 10 and post 12 are shown and that the door will be hingedly secured at one end to a vehicle body (not shown) to open outwardly as indicated by the arrow in Fig. 3. The post and door have complementary edge portions that cooperate in the locking action and for this purpose, the door has the edge portion 14 which extends between and is perpendicular to the outer door side 16 and inner side 18 thereof, with the side 16 extended to form the flange 20. A lug or boss member 22 is formed on the door edge 14 intermediate its ends to extend outwardly therefrom in the same direction as the flange 20 and has the hook-like nipple or knob portion 24 that extends parallel to and spaced from the door edge 14 in a direction towards the inner door side 18 as shown in Fig. 4. On the post 12 is the edge portion 26 that is integral with and perpendicular to the inner post side 28 and extends toward, but not to the outer post side 30 as illustrated. The free inner end of post edge 26 is provided with a reverse J-shaped notch or recess 32 which serves as a seat for and is complementary in shape to the lug 22 and knob portion 24 thereon when the door is in closed position. The outer side 30 of the post 12 terminates in an inwardly extending shoulder 34 from which a flange 36 spaced outwardly from the free end of the post edge portion 26 extends perpendicularly toward but not to a point in the same plane as a line projected from the forward edge of post edge 26 toward post side 30. Thus arranged, the flanges 20 and 36 are in overlapping position with the free end of flange 20 closely adjacent shoulder 34 when the door is closed. Weather stripping 38 secured to the inner side of shoulder 20 may be provided for obvious purposes. From the inner extremity of flange 36 an edge portion 40 curves downwardly and forwardly to the post inner side 28 to form a recess 42 defined by the post edge portion 26, the edge portion 40 and the flange 36 with the space between the free end of edge 26 and flange 36 providing an opening to the front toward the side 14 of the door member 10.

Within the recess 42 and at the end thereof nearest the inner post side 28 is mounted a block-like support member 44. A pair of elongated strap arm members 46 and 48 respectively, are oppositely disposed in spaced relationship and one end of each arm is pivotally secured to one side respectively of the block 44 so that the arms are capable of being moved toward and away from the recess forming side of edge 26. Between the other ends of the arms 46 and 48 is rotatably mounted a member 50 that is substantially circular in shape with a quarter segment removed to provide the flat bearing surface 52 and having a notch 54 spaced from the surface 52 as illustrated in Fig. 3. A spring member 56 secured to the block 44 engages the straps 46 and 48 to normally yieldingly urge them toward the post edge portion 26 and a spring member 58 secured to strap 48 engages member 50 to normally yieldingly rotate it to a position where the surface 52 will extend through the opening in the recess toward and perpendicular to the door edge 14 at a point where when the door is closed, surface 52 will abut the lug 22 at the edge opposite to the knob portion 24. In this position, the opening to notch 54 will be aligned with the longitudinal axes of straps 46 and 48.

Mounted on the support member 44 and extending between the arms 46 and 48 toward the rotatable member 50 is an electromagnet or solenoid 60 of any suitable form having a spring loaded stem or core 62 normally tending to move into engagement with the member 50 and when the door 10 is closed, the core 62 will be seated in notch 54 to prevent rotation of member 50 as shown in Fig. 1. The electromagnet is connected by wire 64 to an electric circuit 66 having a switch means 68 so that when switch 68 is closed, the action of the electromagnet or solenoid will retract the core 62 from notch 54.

Thus constructed and arranged, this locking mechanism will operate in the following manner. Fig. 1 illustrates the position of the various elements when the door is closed and it will be observed that the lug 22 on the door is held against movement on three sides within the notch 32 and similarly held on a fourth side by the surface 52 of rotatable member 50. Spring 58 will normally urge member 50 to the position shown in Fig. 1 where notch 54 will be aligned with stem 62 which being spring loaded will seat therein to lock the member 50 against rotatable movement, thus making it impossible for the door to open. To open the door, switch 68 is closed causing core 62 to be retracted as shown in Fig. 3 and as the door is pushed outwardly, the lug 22 will cause the member 50 to rotate counterclockwise (Fig. 3) until surface 52 is moved out of engagement with the lug and allows the door to swing free of contact with post 12. Once the door is opened, spring 58 will urge member 50 back to closed position where it will of course obstruct the passage of lug 22 when the door is being closed. However, as the door is moved to closed position (Fig. 4), the knob portion 24 on lug 22 will engage the perimeter of member 50 in a cam action which causes the arms 46 and 48 to move on their pivot on block 44 away from post edge 26 sufficiently whereby lug 22 can seat in the notch 32. As soon as the lug moves past member 50 so that the cam action described has ceased, spring 56 is capable of returning arms 46 and 48 to parallel engagement with post edge 26 when member 50 again abuts the door lug as described.

It will be understood that switch 68 must be closed only long enough to permit a slight rotation of member 50 so that notch 56 will not register with core 62. Thereafter, the perimeter of member 50 will hold the core retracted against its spring means. The closing of the switch can be accomplished in a variety of ways that would not affect the operation of the lock and therefore, they are not described in detail. However, it is well known, for example, that switch 68 may be connected to the door handle or to a separate means independent of the door and in the latter case would provide an extremely safe locking means for doors on vehicles in which small children are passengers.

It will also be appreciated that while I have described a preferred embodiment of my invention as applied to an automobile door, the locking mechanism disclosed herein can be adapted to most any type door, drawer or the like, without departing from the principle of my invention.

Some changes may be made in the construction and arrangement of my locking mechanism without departing from the real spirit and purpose of my invention, and it is my intention to cover by my claims, any modified forms of structure or use of mechanical equivalents which may be reasonably included within their scope.

I claim:

1. In a locking mechanism, a fixed member, a second member movable towards and away from said fixed member, a projecting lug on said second member, said fixed member provided with a recess into which said lug is capable of seating at times, an arm pivotally secured at one end to said fixed member, spring means yieldingly holding said arm toward said second member, a rotatable member on the free end of said arm, spring means for yieldingly holding said rotatable member in one direction of rotation where it is capable of engaging said lug when seated, means for locking said rotatable member against rotation from its lug engaging position, said lug engaging said locked rotatable member when the second member is moved toward the fixed member and said rotatable member movable out of the path of said lug by the pivoting of said arm away from the second member, whereby said lug is seated and said first mentioned spring means returns said arm toward said second member so that said locked rotatable member engages and holds said seated lug against unseating, and means for releasing the locking means on said rotatable member so that it is capable of rotating out of engagement with said lug.

2. In a locking mechanism, a fixed member, a second member movable towards and away from said fixed member, a projecting lug on said second member, said fixed member provided with a recess into which said lug is capable of seating at times, an arm pivotally secured to one end to said fixed member, spring means yieldingly holding said arm toward said second member, a rotatable member on the free end of said arm, spring means for yieldingly holding said rotatable member in one direction of rotation where it is capable of engaging said lug when seated, a spring loaded stem member on said fixed member normally engaging said rotatable member to hold it against rotation from its lug engaging position, said lug engaging said locked rotatable member when the second member is moved toward the fixed member and said rotatable member movable out of the path of said lug by the pivoting of said arm away from the second member, whereby said lug is seated and said first mentioned spring means returns said arm toward said second member so that said locked rotatable member engages and holds said seated lug against unseating, and means for releasing said stem from engagement with said rotatable member.

References Cited in the file of this patent

UNITED STATES PATENTS

| Number | Name | Date |
|---|---|---|
| 1,199,199 | Mason | Sept. 26, 1916 |
| 1,665,303 | Hunter | Apr. 10, 1928 |
| 2,003,731 | Beito | June 4, 1935 |
| 2,171,365 | Harding | Aug. 29, 1939 |
| 2,174,078 | Burgin | Sept. 26, 1939 |
| 2,466,993 | Lickteig | Apr. 12, 1949 |
| 2,552,390 | Bacon et al. | May 8, 1951 |